Nov. 2, 1965   C. R. BRANDT ETAL   3,216,022
RECORDER
Filed July 17, 1961   5 Sheets-Sheet 3

INVENTOR.
CARL R. BRANDT
ROBERT A. JANKOWICZ
BY ROBERT B. WATROUS

Arthur H. Swanson
ATTORNEY.

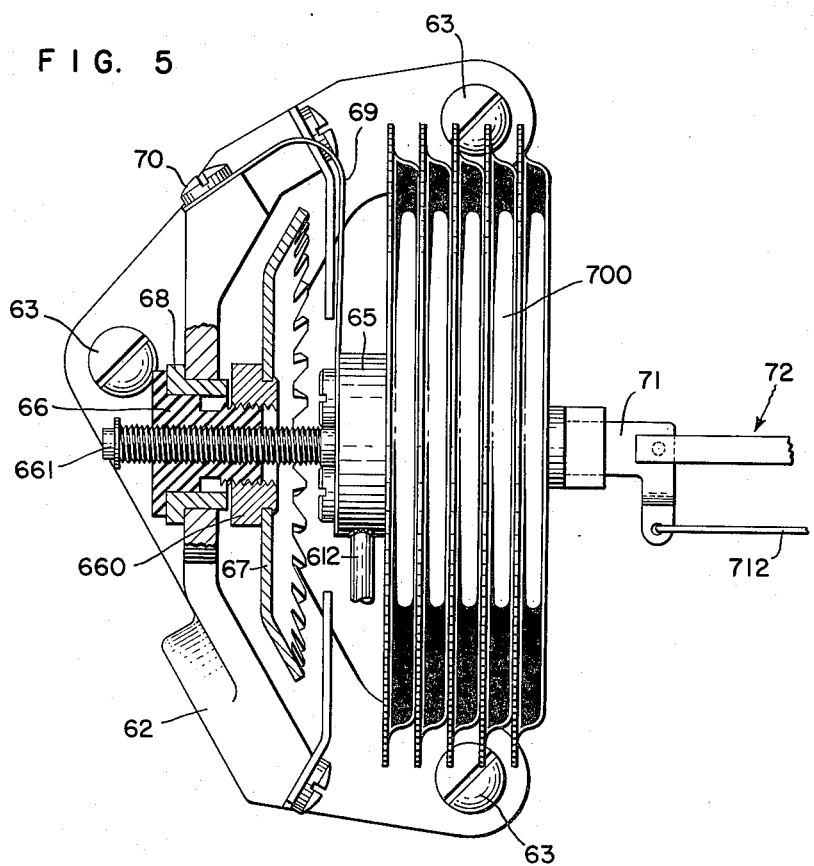

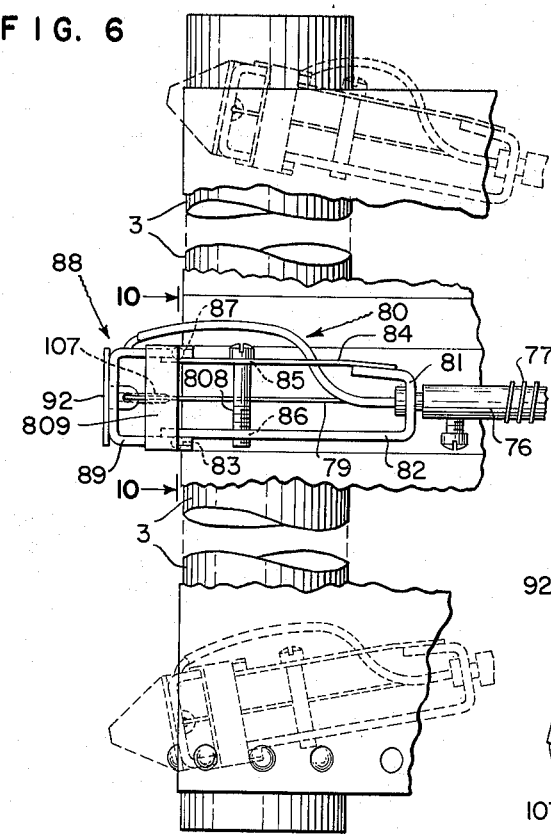
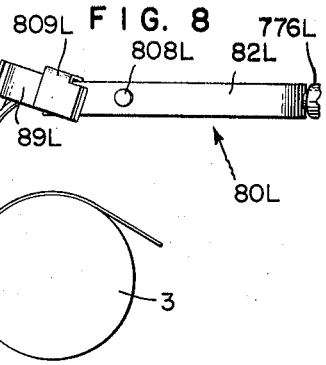
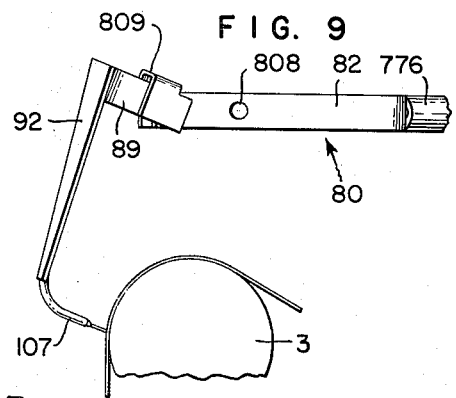
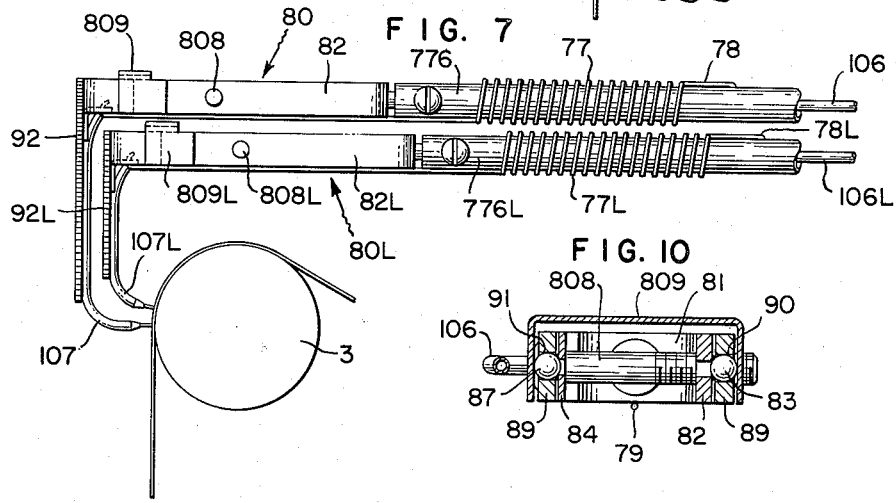
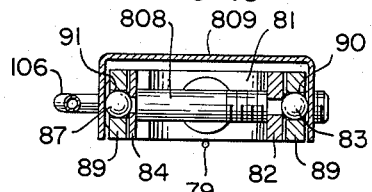

United States Patent Office 3,216,022
Patented Nov. 2, 1965

3,216,022
RECORDER
Carl R. Brandt, Oreland, Pa., Robert A. Jankowicz, Trenton, N.J., and Robert B. Watrous, Philadelphia, Pa., assignors to Honeywell Inc., a corporation of Delaware
Filed July 17, 1961, Ser. No. 124,512
11 Claims. (Cl. 346—140)

This invention relates to recorders and more specifically to strip-chart recorders having one or more pens.

These recorders have many novel and convenient features which form the objects of this invention.

One object of this invention is to provide means whereby a roll of chart paper can be simply placed in a shelf in the recorder and fitted over a time roller and over a take-up roller so that the chart roll is readily inserted into or removed from the recorder.

A further object of this invention is to provide means for lifting the pens and tearing off a portion of the chart.

An additional object of this invention is to provide means for driving the pens so that the pens are oscillated about a first axis and about a second axis at an angle to the first axis, so that each of the pens records in a substantially straight line.

Another object of this invention is to provide means whereby the ink is supplied to the pens continuously and whereby the flow of ink to the pens may be started whenever necessary such as after the recorder has been stopped for any considerable period of time.

A better understanding of the present invention may be had from the following detailed description when read in connection with the accompanying drawings, in which:

FIG. 5 is a top or plan view with parts in horizontal cross section of the pressure responsive element.

FIG. 6 is a top or plan view of the upper pen in mid-position and, in dashed lines, in the end positions of its path of travel.

FIG. 7 is a side elevation of both pens in mid-position.

FIG. 8 is a side elevation of the lower pen in end position.

FIG. 9 is a side elevation of the upper pen in end position.

FIG. 10 is a vertical, cross-section on line 10—10 of FIG. 6 as viewed in the direction of the arrows.

All of the parts of the recorder referred to herein are mounted fixedly on or for movement relative to a chassis C.

Chart drive mechanism

The chart is a long strip of paper or other recording material which comes wound on a cardboard tube and which is drawn off from this cardboard tube, the record is made on the chart, the record is displayed, and the chart is then wound up on another cardboard tube by the recorder.

Figure 2:
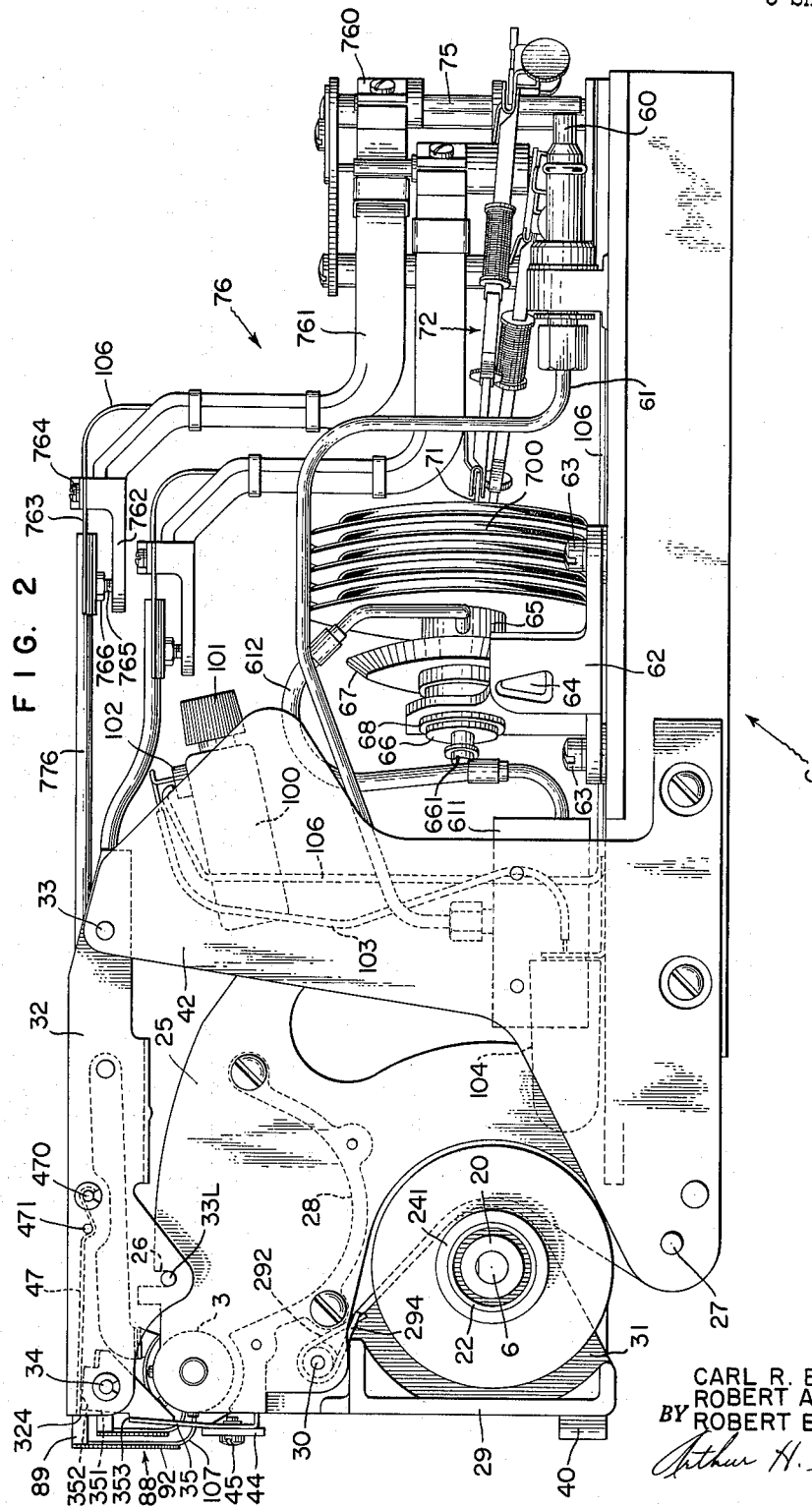
FIG. 2 is a side elevation.
Figure 3:
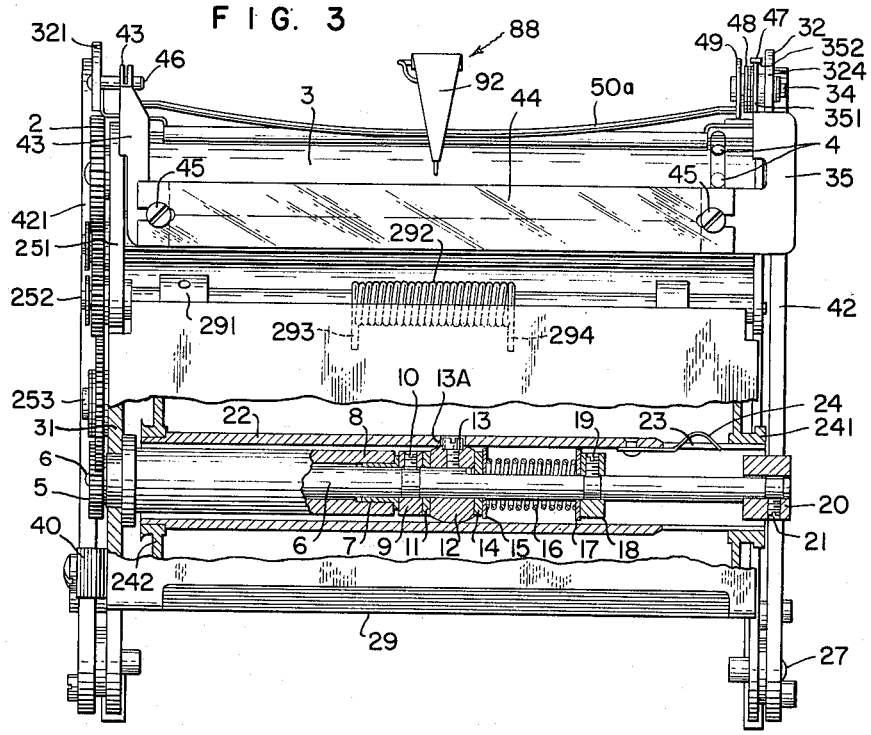
FIG. 3 is partially a front elevation of the strip chart tear-off mechanism and partially a vertical, cross section.
Figure 4:
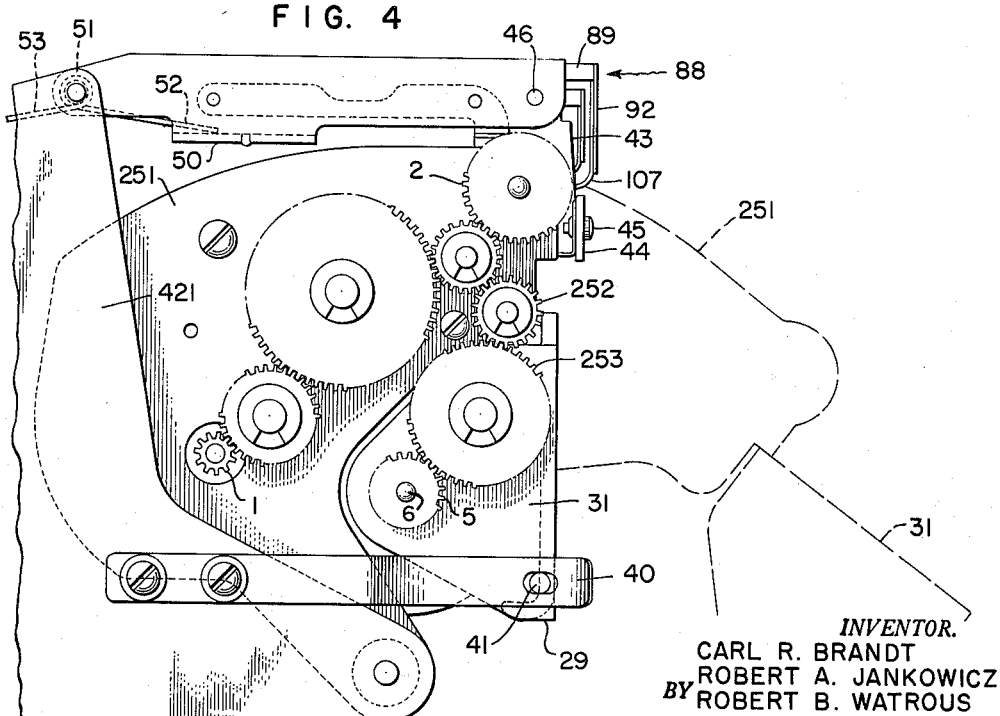
FIG. 4 is a partial side elevation opposite to the side of the mechanism shown in FIG. 2 showing the chart drive assembly.

The means whereby the chart is drawn from one tube (known as the supply roll) to another tube (known as the take-up roll) are shown, especially in FIG. 4, and comprise a train of gearing having an input gear 1 adapted to mesh with a constant speed, electric motor (not shown). The input end of this chain of gearing is mounted on a flat plate 251. The train includes a gear 2 attached to a timing roller 3 (FIG. 3) which has a plurality of studs 4 on its outer surface adapted to engage with perforations in the chart. The gear train also includes a gear 252 mounted on plate 251 and meshing with a gear 253 mounted on a bracket 29. Gear 253 is adapted to oscillate about the axis of gear 252 and to remain in mesh therewith when the bracket 29 is rotated about its pivot 30 (FIG. 2).

Gear 253 drives output gear 5 which is mounted on the end of shaft 6 which drives the take-off roller through a clutch. Shaft 6 is mounted in wall 31 of bracket 29 by bearings including bearing 7 supported on tube 8.

FIG. 3 shows that this clutch comprises a collar 9 secured to shaft 6 by a screw 10 and bearing at its right hand end on a friction washer 11 which engages with one face of a hub 12 which supports a screw 13 which rides in a slot 13A in tube 22. Slot 13A is elongated in the direction of the axis of tube 22 so that the sides of the slot 13A engage the sides of the screw head 13 while the ends of the slot are not engaged with the head of screw 13. The right hand side of hub 12 engages with a second friction washer 14 which is engaged by a metal washer 15 which takes the stress of a compression spring 16. The opposite end of spring 16 bears on a second metal washer 17 which engages with a second collar 18 secured to shaft 6 by a set screw 19. The right hand end of shaft 6 carries a knob 20 secured thereto by a set screw 21. The right end of the tube 22 has four spaced apart slots 23 in it. Through one of these slots extends a bent leaf spring 24 adapted to engage with an opening in the cardboard tube on which the wound up roll of chart is located.

The operation of this clutch is as follows. Since hub 12 is free to rotate on shaft 6, when tube 22 is held by the tension of the chart, the hub 12 slips on the washers 11 and 14. This permits the driving train of gearing to drive shaft 6 without tearing the chart. This action permits the chart to wind up on the tube 22 so that the chart winding up on the tube is at various radii from the center of the tube. Shaft 6 is driven at a speed in excess of the fastest speed which tube 22 will turn in rolling up the chart.

Tube 22 carries rigidly thereon, at its left hand end, a disc 242 of plastic or the like and, at its right hand end, a second disc 241 also of plastic or the like. Disc 241 has a sliding fit with tube 22. Discs 241 and 242 serve to retain the roll of chart paper on the tube 22.

Figure 1:
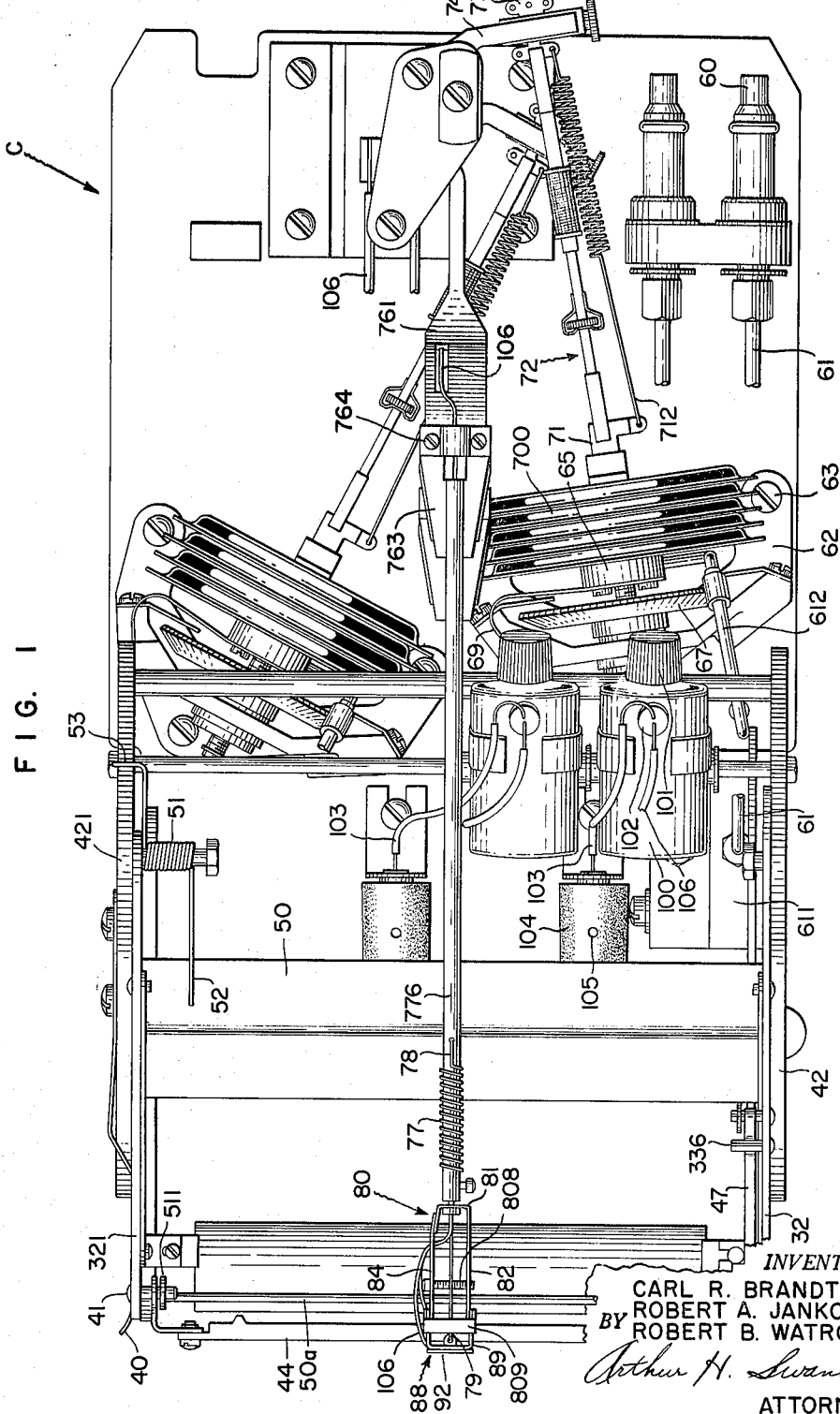
FIG. 1 is a top or plan view.

FIGS. 1 and 2 show that the chassis C has flat plates 42 and 421 mounted on it. A latch comprised of side plates 32 and 321 connected by cross plate 50 is pivoted at 33 on plates 42 and 421. The latch carries a latch pin 33L. Latch pin 33L cooperates with a notch 26 (FIG. 2) in plate 25 so that plate 25, timing roller 3, and take-up roller 22, which are carried by plates 25 and 251, are restrained from oscillating about pivot 27. A coil spring 51 (FIG. 1) is mounted on and bears at one end 53 against chassis C. The opposite end 52 of spring 51 bears on plate 50 and biases latch pin 33L for counter-clockwise movement into engagement with notch 26 (FIG. 2).

Bracket 29 is pivoted at 30 on plates 25 and 251 attached to trough 28. Bracket 29 has a triangular end plate 31 on it. End plate 31 supports tube 8 which supports shaft 6. A coil spring 292 (FIG. 3) has one end 293 bearing against trough 28 and one end 294 bearing against bracket 29. Spring 292 thus biases bracket 29 for movement in clockwise direction, as seen in FIG. 2. Bracket 29 is constrained against this clockwise movement by means of a latch comprised of a flat, leaf spring 40 attached to plate 421 by screws or other suitable means. Latch 40 has a hole in it through which passes a latch pin 41 mounted on triangular plate 31 which forms part of the bracket 29.

Tear-off mechanism

FIGS. 1, 2, 3 and 4 show the tear-off mechanism. This tear-off mechanism is mounted on the chassis at pivot 33 by means of a latch constituted by two flat plates 32 and 321 which are connected by a transverse plate 50. In plate 32 is mounted a pin 34 from which hangs a support 35 having a vertical flat face 351 and a horizontal flat face 352 (FIG. 2). These flat faces are adapted to cooperate with a leaf spring 47 mounted on the latch plate 32 by pins 470 and 471. Plate 321 carries pin 46 from which depends support 43. Tear-off bar 44 is mounted on supports 35 and 43 by screws 45.

Pen lifter mechanism

Pin 34 supports bracket 49 and pin 46 supports bracket 511 (FIG. 1). The pen lifter 50a is supported by brackets 49 and 511 and extend beneath the pens.

Operation of chart drive mechanism

As seen in FIG. 2, latch 40 is opened and bracket 29 rotated clockwise about pivot 30.

Starting from the position in which the device is shown in FIGS. 1, 2, 3 and 4, chart paper may be inserted into or removed from the recorder as follows.

The latch 40 is moved clockwise, as seen in FIG. 1, so as to move it from latch pin 41. This unlatches bracket 29 so that it can pivot clockwise, as seen in FIG. 2, about its pivot 30 and can expose take-up roller 22.

Support 35 is used as a handle and rocked clockwise (FIG. 2) about pins 34 and 46 (FIG. 3) from a vertical to a horizontal position. This disengages face 352 of support 35 from engagement with latch spring 47 and engages face 351 with latch spring 47. This also causes face 353 of support 35 to engage with face 324 at the end of plate 32 forming part of the latch formed of plates 32, 321 and 50. This causes support 35 to engage with and lift the latch clockwise.

This clockwise movement carries the pens with the latch by means of the engagement with the pen lifter 50 with the undersides of the pens. The pens are lifted away from the chart so that the chart may be inserted in or withdrawn from the recorder.

Clockwise movement of the latch also lifts latch pin 33L out of notch 26 in plate 25 so that plate 25, timing roller 3, and take-up roller 22, which are carried by plate 25, are free to oscillate about pivot 27. This counter-clockwise pivoting movement permits the plate 25 to move forward from the position in which it is shown in FIG. 2 so as to expose the trough 28 carried thereby. The supply roll of chart paper may then be placed in or removed from the trough 28, laid over timing roller 3, and secured to or removed from a cardboard tube mounted on the take-up roller 22.

The mechanism may then be restored to the position in which it is shown in FIGS. 1, 2, 3 and 4 by moving the plates 25 and 251 clockwise about pivot 27 until pin 33L enters notch 26 and thereby latches the trough 28 in its normal position. Bracket 35 is then turned counter-clockwise about its pivot 34. Then bracket 29 is turned counter-clockwise about pivot 30 until pin 41 enters the hole in leaf spring 40. This latches the bracket 29 in its normal position.

Pen drive

The recorder, according to this invention, may have one, two or more pens. As far as the pen drive and ink delivery is concerned, these pens are substantially duplicates. Therefore, the drive and the ink delivery for the upper pen will be described. Where it is necessary, the same reference characters will be applied to the corresponding parts of the lower pen with the letter "L" added to distinguish them from the upper pen elements.

In order that the pen may draw a substantially straight line on the chart, it is mounted so as to oscillate about a substantially vertical axis and a substantially horizontal axis. This oscillation is caused by a pressure sensitive element 700.

Air under a pressure corresponding to the value of the variable which is desired to record is fed to the element 700 through a male connection 60. Tubing 61 leads to a restriction 611 comprised by a needle valve and a by-pass formed of a small length of capillary tubing. The needle valve and the tubing are connected in parallel. This restriction serves to filter out any undesirable, rapid, eratic changes in the air pressure which would produce a misleading record. The by-pass formed by the tubing is never closed.

From restriction 611 tubing 612 leads to the relatively stationary part 65 of the air-pressure sensitive element comprised by the capsule 700. FIGS. 1, 2 and 5 show that part 65 is mounted on chassis C by means of a support 62 connected to the chassis by screws 63 and having a substantially triangular opening 64 therein. Part 65 is mounted so as to reciprocate but not to rotate in support 62. The means by which this mounting is accomplished comprise a bushing 68 fixedly mounted in part 62. A flanged element 66 is rotatable but not reciprocable in bushing 68 and is fixed to ring 660 and is in screw threaded engagement with the screw threads on part 661 which is connected to part 65. A serrated element 67 is mounted for rotation but not for reciprocation in support 62 by being fastened to ring 660. A leaf spring 69 is connected by screw 70 to support 62 and holds part 65 and screw 661 against rotation while allowing reciprocation thereof. A spring washer is located between bushing 68 and ring 660.

A tool, such as a screwdriver, may be inserted through the opening 64 and engaged with the serrations in the edge of element 67. The element 67 is thereby rotated. This rotation of element 67 causes support 65 to reciprocate and provides a zero adjustment of the air-pressure-sensitive element 700.

This element 700 comprises a plurality of capsules each attached at its edges to the other so as to provide a hollow interior. The free end of element 700 has a connection 71 for attachment to one end of a linkage, generally indicated 72. The details of this linkage are covered by an application for United States Letters Patent in the name of William A. Siegel, filed October 31, 1960, Serial No. 66,219. Linkage 72 is adapted to telescope lengthwise to a limited extent. Linkage 72 is biased against this lengthwise, telescoping movement by a coil spring 712. The output end of linkage 72 is attached to an output element 73 connected to a lever arm 74. Lever arm 74 rocks shaft 75 (FIG. 2) about a vertical axis. Also mounted on shaft 75 for oscillation about the axis of shaft 75 is a pen arm, generally indicated 76. Pen arm 76 carries at its left end a pen support, generally indicated 80.

The pen arm is attached to shaft 75 by a clamp 760 which engages with a rigid portion 761 having at its left end a shelf 762. Opposite shelf 762 are a pair of leaf springs 763 secured to rigid arm 761 by a clamp 764.

A tube 776 is secured at its right end between the leaf springs 763 so that the left end of the tube 776 can be raised upward about the leaf springs as a pivot. A screw 765 is positioned for adjustment between the right end of tube 776 and shelf 762 so that the space between these two members may be altered. A nut 766 is mounted on bolt 765.

As is best seen in FIGS. 6 and 7, pen support 80 comprises a base portion 81 having a relatively rigid arm 82 to which is attached a ball 83 and in which is a screw-threaded hole 86. Pen support 80 also comprises a relatively flexible arm 84 having an unthreaded hole 85 through it and having a ball 87 attached to it. A screw 808 passes freely through hole 85 and engages with the threads in hole 86 so as to adjust the distance between the arms 82 and 84.

Mounted on pen support 80 is an element, generally indicated 88, and comprising a relatively rigid, U-shaped portion 89 having holes 90 and 91 therein. On the front of element 88 is mounted an indicator 92 and a pen 107. Element 88 is mounted so as to oscillate about a horizontal, pivoted axis by the engagement between ball 83 and hole 90 and the engagement between ball 87 and hole 91. Element 88 is constrained for partial rotation in a counter-clockwise direction by spring 77 which is attached at one end 78 to pen arm 76 and which is attached at the opposite 79 to element 88. A band of sheet metal 809 is U-shaped in vertical cross section and overlies balls 83 and 87 and holes 90 and 91. Band 809 thus limits the horizontal distance between rigid arm 81 and flexible arm 84 by limiting the adjustment of screw 808 until balls 83 and 87 engage the inner walls of band 809.

FIGS. 1 and 7 show the pens in the mid-position of their movement along a chart. FIG. 9 shows the pen at the lower end of its movement across the chart, as seen in either of the dotted-line positions shown in FIG. 6. Comparison of FIGS. 7 and 9 shows the way in which the pen 107 has moved clockwise from the vertical position it occupies in the mid-point of its path of travel to the tilted position which it occupies at either end of its path of travel. This rocking movement of the pen is necessary to accommodate the increased distance between the axis of shaft 75 and the tip of pen 107 as the pen moves across the chart.

Ink delivery

Means for supplying ink to the pens comprise a reservoir or bottle 100 having a cap 101 through which ink may be supplied to the reservoir. A plug 102 closes a hole in the side of reservoir 100. Through plug 102 extends a tubing 103 which leads to a pump comprised of a flexible bulb 104 having an opening 105 in the upper portion thereof. Plug 102 also has extending through it one end of a tubing 106 which leads from the reservoir 100 along the pen arm 76 through the upper arm of the rigid pen 107 the lower end of which is adapted to engage with the chart.

When the recorder is to be started for the first time, or after it has been standing idle for any length of time, ink may be forced from the reservoir 100 to the pen 107 by placing a finger over the hole 105 and compressing the bulb 104 one or more times so as to force the ink from the reservoir 100 to the pen 107.

What is claimed is:

1. A pen-actuating linkage for an oscillating-to-straight line transforming strip chart recorder, comprising an elongated member forming a pen arm, a first bearing forming a fulcrum at one end of the pen arm about which an oscillating input motion can be applied to the pen arm, a U-shaped member having a pen forming an integral part thereof, a second bearing between the other end of the elongated member and an outer end of one of the legs forming the U-shaped member, said pen forming the outer end of the other leg of the U-shaped member and being positioned below the remaining portion of the U-shaped member and extending away from the outer end of the first-mentioned leg, the end of the pen being positioned for physical contacting movement along a surface of a chart that extends along a plane that is normal to and spaced from the longitudinal axis of the first bearing, a biasing means extending between the elongated pen arm member and the contacting leg of the U-shaped member to retain the pen in substantially straight line contact with the chart as the other leg is pivoted about the second bearing by the oscillating motion being applied to the pen arm.

2. The pen-actuating linkage defined by claim 1 wherein an air-pressure-operated motor is connected to apply the oscillating input motion to the elongated member.

3. The pen-actuating linkage defined by claim 1 wherein an air-pressure-operated motor is connected to apply the oscillating input motion to the elongated member, a chassis and a means is employed to mount said motor on said chassis for movement relative to said chassis to adjust the zero position of said first bearing and said pen.

4. The pen-actuating linkage defined by claim 1 wherein a lever is connected to said elongated member to oscillate it about said first bearing, a telescoping link is connected at one end to said lever, and an air-pressure-operated motor connected to the other end of said link is adapted to oscillate said lever and elongated member about said first bearing.

5. The pen-actuating linkage defined by claim 1 wherein a lever is connected to said elongated member to oscillate it about said first bearing, an axially telescoping link is connected at one end to said lever, an air-pressure-operated motor is employed having a relatively stationary end and a relatively movable end whose movable end is connected for movement with the other end of said link, a support means including a chassis is employed to mount the relatively stationary end of said motor thereon, a manually-adjustable zero adjusting screw member is positioned between the support means and the relatively stationary end of the motor to reciprocate the relatively stationary end with respect to said support means, and a flexible leaf spring is employed that is connected to and extends between the support means and the relatively stationary end of the motor to thereby maintain the last-mentioned end in a non-movable condition with respect to said support means during a manual adjustment of the screw member.

6. The pen-actuating linkage defined by claim 1 wherein an air-pressure-operated motor having a relatively fixed end and a relatively movable end is connected to said elongated member to oscillate said elongated member about said first bearing, a support means including a chassis is employed to mount the relatively stationary end of said motor thereon, a serrated disc is mounted for non-reciprocating rotatable movement on a ring that forms another portion of the support means, a bolt having screw threads thereon is interfitted with screw threads on said ring and connected for reciprocal movement with the relatively stationary end of said motor, and the support means is provided with a wall surface that forms an opening therein through which a tool may be inserted to rotatably engage serrations on the disc and thereby effect simultaneous rotatable movement of the ring and reciprocal movement of the bolt.

7. An oscillating-to-straight line transforming linkage, comprising an elongated member, a first bearing forming a fulcrum at one end of the member about which an oscillating input motion can be applied to the member, a U-shaped member, a second bearing between the other end of the elongated member and an outer end of one of the legs forming the U-shaped member, the outer end of the other leg of the U-shaped member being positioned below the remaining portion of the U-shaped member and extending away from the outer end of the first-mentioned leg, the other leg being positioned for physical contacting movement along a bearing surface that extends along a plane that is normal to and spaced from the longitudinal axis of the first bearing, a biasing means extending between the elongated member and the contacting leg of the U-shaped member to retain the last-mentioned leg in substantially straight line contact with the bearing surface as the other leg is pivoted about the second bearing by the oscillating motion being applied to the elongated member.

8. The oscillating-to-straight line transforming linkage defined by claim 7 wherein the second bearing is positioned above the position of the end of the leg of the U-shaped member that is in contact with the bearing surface, said position of the second bearing and end of the last-mentioned leg of the U-tube thereby affording pivotal movement of the U-shaped member about the second bearing in a clockwise and counter-clockwise direction as oscillating movement is simultaneously applied to the elongated member and the bearing surface contacting leg end of the U-shaped member is moved in associated opposite directions from one portion of the contacting surface to another.

9. The oscillating-to-straight line transforming linkage defined by claim 7 wherein a pen is employed as a portion of the leg of the U-shaped member that is in contact with the bearing surface.

10. The oscillating-to-straight line transforming linkage defined by claim 7 wherein the second bearing is positioned above and to the right of the position of the end of the leg of the U-shaped member that is in contact with the bearing surface, said position of the second bearing and end of the last-mentioned leg of the U-tube thereby affording pivotal movement of the U-shaped member about the second bearing in a clockwise and counterclockwise direction as oscillating movement is simultaneously applied to the elongated member and the bearing surface contacting leg end of the U-shaped member is moved in opposite directions from one portion of the contacting surface to another and wherein a pen is employed as a portion of the leg of the U-shaped member that is in contact with the bearing surface.

11. The oscillating-to-straight line transforming linkage defined by claim 7 wherein the pivoted U-shaped member and the location of the second bearing with respect to the surface contacting portion of the U-shaped member are of a selected magnitude to maintain the distance between the central axis of the second bearing and the end of the leg of the U-shaped member in contact with the bearing surface at a constant value while oscillating motion applied to the elongated member moves the leg of the U-shaped member in substantially straight line contact with the bearing surface.

References Cited by the Examiner
UNITED STATES PATENTS

| | | | |
|---|---|---|---|
| 1,847,918 | 3/32 | Blanchard | 346—68 |
| 2,176,777 | 10/39 | Tate | 346—140 |
| 2,245,784 | 6/41 | James | 346—128 |
| 2,626,201 | 1/53 | Young et al. | 346—140 |
| 2,669,501 | 2/54 | Young et al. | 346—140 X |
| 2,671,710 | 3/54 | Bowditch | 346—136 X |
| 2,718,450 | 9/55 | Leonard et al. | |
| 2,777,747 | 1/57 | Gilson et al. | 346—136 |
| 2,888,310 | 5/59 | Perry | 346—68 |
| 2,902,332 | 9/59 | Bauer | 346—136 |
| 2,913,299 | 11/59 | Clift | 346—136 X |
| 2,950,164 | 8/60 | Albright | 346—140 |
| 2,977,180 | 3/61 | Zenner | 346—140 |
| 3,046,556 | 7/62 | Summers et al. | 346—140 |
| 3,051,408 | 8/62 | Finch | 346—136 X |

LEO SMILOW, *Primary Examiner.*

EMIL G. ANDERSON, *Examiner.*